(12) United States Patent
Muraro

(10) Patent No.: US 6,279,988 B1
(45) Date of Patent: Aug. 28, 2001

(54) CAB FOR EARTH-MOVING MACHINES

(75) Inventor: Umberto Muraro, Noventa Vicentina (IT)

(73) Assignee: Komatsu Utility Europe S.p.A., Vicentina (IT)

( * ) Notice: Subject to any disclaimer, the term of this patent is extended or adjusted under 35 U.S.C. 154(b) by 0 days.

(21) Appl. No.: 09/672,055

(22) Filed: Sep. 29, 2000

(51) Int. Cl.⁷ ........................................................ B60J 7/00
(52) U.S. Cl. ............................. 296/190.11; 296/146.13; 160/213; 160/206; 160/199
(58) Field of Search ..................... 296/190.11, 146.13; 160/206, 213, 199

(56) References Cited

U.S. PATENT DOCUMENTS

| | | | |
|---|---|---|---|
| 2,249,273 | * 7/1941 | Flogaus | 296/146.13 |
| 2,667,230 | * 1/1954 | Duff et al. | 180/294 |
| 2,815,243 | * 12/1957 | Campbell | 296/190.11 |
| 2,826,450 | * 3/1958 | Williams | 296/77.1 |
| 3,692,083 | * 9/1972 | Swanson et al. | 160/206 |
| 3,802,530 | * 4/1974 | Purcell et al. | 296/146.13 |
| 3,982,601 | * 9/1976 | Williams | 180/89.12 |
| 4,416,486 | * 11/1983 | McNaught et al. | 296/146.13 |
| 5,002,332 | * 3/1991 | Ikeda | 296/146.13 |
| 5,125,716 | * 6/1992 | Smith et al. | 296/146.13 |
| 5,435,372 | * 7/1995 | Kikuchi | 160/206 |
| 5,564,774 | * 10/1996 | Shinsen | 296/146.13 |
| 5,577,795 | * 11/1996 | Shinsen | 296/146.13 |
| 5,601,131 | * 2/1997 | Morris | 160/213 |
| 5,724,837 | * 3/1998 | Shin | 160/213 |
| 5,782,282 | * 7/1998 | Chen | 160/206 |
| 5,951,098 | * 9/1999 | Waldeck et al. | 296/146.13 |
| 5,992,496 | * 11/1999 | Lee | 160/199 |
| 5,992,918 | * 11/1999 | Gobart et al. | 296/146.13 |
| 6,068,327 | * 5/2000 | Junginger | 296/146.13 |
| 6,149,228 | * 11/2000 | O'Neill et al. | 296/190.11 |

* cited by examiner

Primary Examiner—Joseph D. Pape
Assistant Examiner—Kiran B. Patel
(74) Attorney, Agent, or Firm—Browdy and Neimark

(57) ABSTRACT

A cab for earth-moving machines having a center of rotation and an operating radius corresponding to the maximum dimensions of the cab during the rotation of the machine, comprising a closed structure having at least an opening, and at least a door hinged to the structure in correspondence with the opening, movable from a closed position to an open position, and comprising at least a first and a second wing mutually connected in bellows-like fashion and such that, in the open position, the distance of all points of the door from the center of rotation is lesser than the operating radius. The cab can further comprise at least a guide obtained in proximity to the edge of the opening, and at least a guide element integral with the door and slidingly engaged to the guide to guide the movements of the door.

15 Claims, 3 Drawing Sheets

CAB FOR EARTH-MOVING MACHINES

BACKGROUND OF THE INVENTION

The present invention relates to a cab for earth-moving machines of the kind comprising the characteristics expressed in the preamble to claim 1.

Earth-moving machines are composed of a frame mounted on wheels or tracks, whereon is pivotally fastened an articulated arm bearing a work tool. In most applications, the work tool is constituted by a shovel or bucket.

In less frequent applications, the tool can also be constituted by other attachments, such as snow shovels, pneumatic hammers and augers.

On the frame is mounted a cab for housing an operator tasked with maneuvering the earth-moving machine.

The cab generally comprises a closed structure having at least an opening, which can be closed with a door, such as to allow operator access. In the cab are mounted a seat and, in front of the seat, control organs and/or pedals to allow the operator to control and maneuver the machine. Although closed, the cab still guarantees good visibility for the operator since it is largely built with see-through materials.

Hereafter, reference shall be made to earth-moving machines of the kind whose frame has two parts: a first part able to rotate about a substantially vertical axis and bearing the cab and the articulated arm, and a second fixed part whereon the wheels (or tracks) are mounted.

Advantageously, the invention is preferably destined to this type of machines. The invention can nonetheless be applied in general to every type of earth moving machine.

As is well known, doors of earth-moving machine cabs must be able to be locked, while the machine maneuvers, in the closed or open position, to avoid being needlessly banged about due to the machine's movements.

To this end, cabs are provided with appropriate latching means.

The possibility to keep the door open or closed meets two different needs of the orator. On one hand, the operator can keep the door closed to isolate him/herself from the noise and dust created by the machine. On the hand, he/she can keep the door open both to climb and descend from the machine more easily, and to allow air to circulate in the cab during particularly warm days.

A first known type of doors provides for the doors to be slidingly mounted on the cab, and to be able to moved from the closed position to the open position, always remaining adjacent to the cab.

A second known type of doors provides instead for the doors to hinged onto the cab according to a substantially vertical axis of rotation about which they can rotate from the closed position to the open position completing a rotation of about 180°.

In this second case, doors are adjacent to the cab only when they are in the closed position or in the open position. In any other position they may assume, they obviously project from the cab.

The prior art described, however, has several drawback.

Since in earth-moving machines the cab can rotate 360°, an essential characteristic is represented by the operating radius of the machine itself This radius is defined as the radius of the largest circumference described by a point of the cab during the rotation of the cab itself about the pivot point on the fixed part of the frame whereon it is installed.

To make the operation of the machine safer, it is very important that no part of the cab project beyond the operating radius of the machine itself.

If the condition is met, one is guaranteed that during operation there will be no accidental impacts of the cab itself against any obstacle, such as a tree, a post, a wall.

This is important because in case of impact, on one hand the cab would be damaged, on the other the operator's safety would be Jeopardized, as he/she could suffer, due to the considerable backlash, contusions, whiplash or other similar injuries.

The above represents a problem that reflects on machine doors, because, while such doors are certainly within the operating radius of the machines when closed, they are not necessarily within it when open.

In particular, the operating radius becomes a critical parameter for the design of the cab of a machine, when the dimensions of the machine itself are very small. The conditions that the door, in the open condition, must fall within the operating radius is more difficult to meet the smaller the dimensions of the machine.

In particular, for the cabs of mini excavators, so small as barely to contain the operator, the doors made in accordance with the prior art do not, for the most part, fall within the operating radius of the machine when they are in the open position.

As stated, this is a hazard as it risks causing material damage to the cab and it jeopardizes operator safety.

SUMMARY OF THE INVENTION

In this situation, the technical task at the basis of the present invention is to obtain a cab for earth-moving machines that overcomes the aforementioned drawbacks.

In particular, the technical task of the present invention is to provide a cab for earthmoving machine that remains within the operating radius of the machine, regardless of the operating conditions and the dimensions of the machine.

The specified technical task and the aims set out above are substantially achieved by a cab for earth-moving machines, as described in the claims that follow.

BRIEF DESCRIPTION OF THE DRAWINGS

Further features and advantages of the invention shall become more readily apparent from the detailed description that follows of a preferred but not exclusive embodiment of a cab for earth-moving machines, illustrated in the accompanying drawings, in which.

DESCRIPTION OF THE PREFERRED EMBODIMENTS

With reference to the aforementioned figures, the reference number 1 globally indicates a cab for earth-moving machines.

Figure 1:
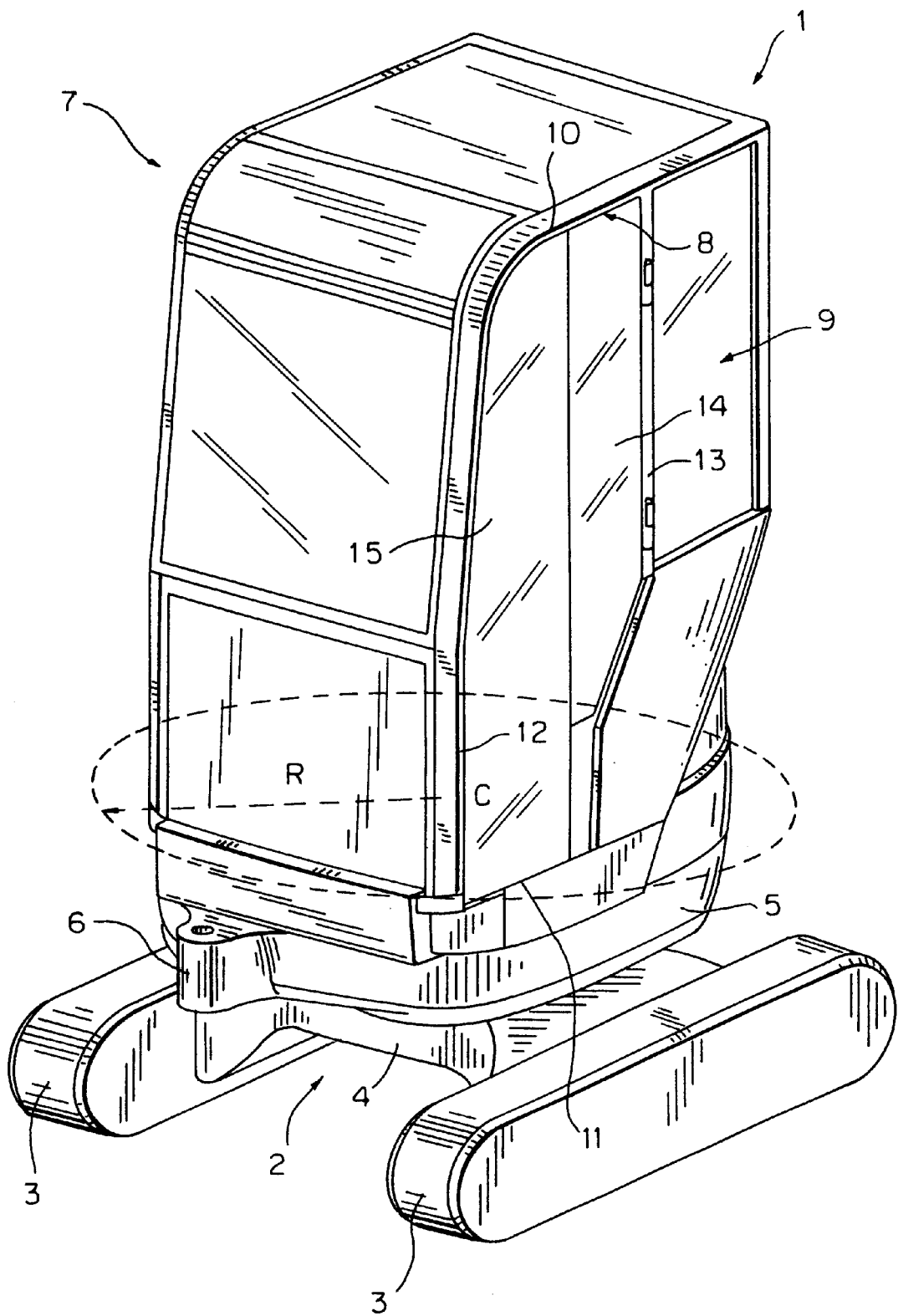
FIG. 1 is a schematic perspective view of a cab for earth-moving machines according to the present invention, mounted on the frame of an earth-moving machine.

FIG. 1 shows the cab 1 mounted on a frame 2 of an earth-moving machine. The frame 2 is mounted on tracks 3 and comprises a fixed part 4 and a movable part 5 whereon the cab 1 is mounted.

On the movable part 5 of the frame 2 is also provided a junction element 6 for the coupling of an articulated arm (not shown in the figure because it is of a known type).

The cab 1 comprises a closed structure 7 having at least an opening 8, and at least a door 9 hinged to the structure 7 in correspondence with the opening 8 and movable from a closed position to an open position.

When it is mounted on an earth-moving machine, the cab is able to rotate together with the movable part of the frame about a substantially vertical axis of rotation C.

In the opening 8 one can identify an upper part 10, a lower part 11, a front part 12 and a rear part 13.

In the preferred embodiment the door 9 comprises a first wing 14 and a second wing 15 connected in bellows-like fashion.

Figure 3:
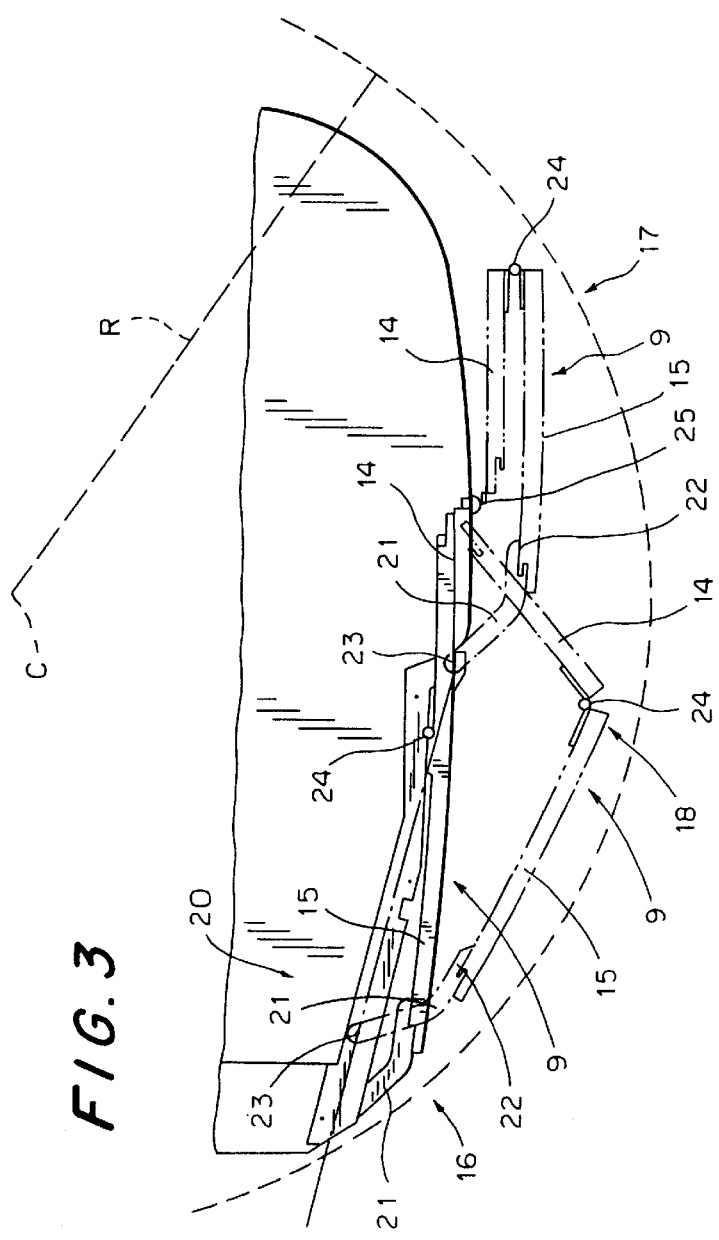
FIG. 3 is a plan view of the part of cab that comprises the door of FIG. 2.

FIG. 3 shows, with solid line 16, the door 9 in the closed position and, with dashed lines 17 and 18, respectively the door 9 in the open position and in an intermediate position.

FIGS. 1 and 3 also indicate the operating radius R coinciding with the maximum dimensions of the cab during the rotation of the machine. As is readily observable, in the open position the distance of all points of said door 9 from the center of rotation C of the machine is lesser than the operating radius R.

The first wing 14 is hinged to the structure 7 and the second wing 15 is hinged to the first wing 14; both hinges are constructed in such a way as to allow rotation about a substantially vertical axis.

Figure 2:
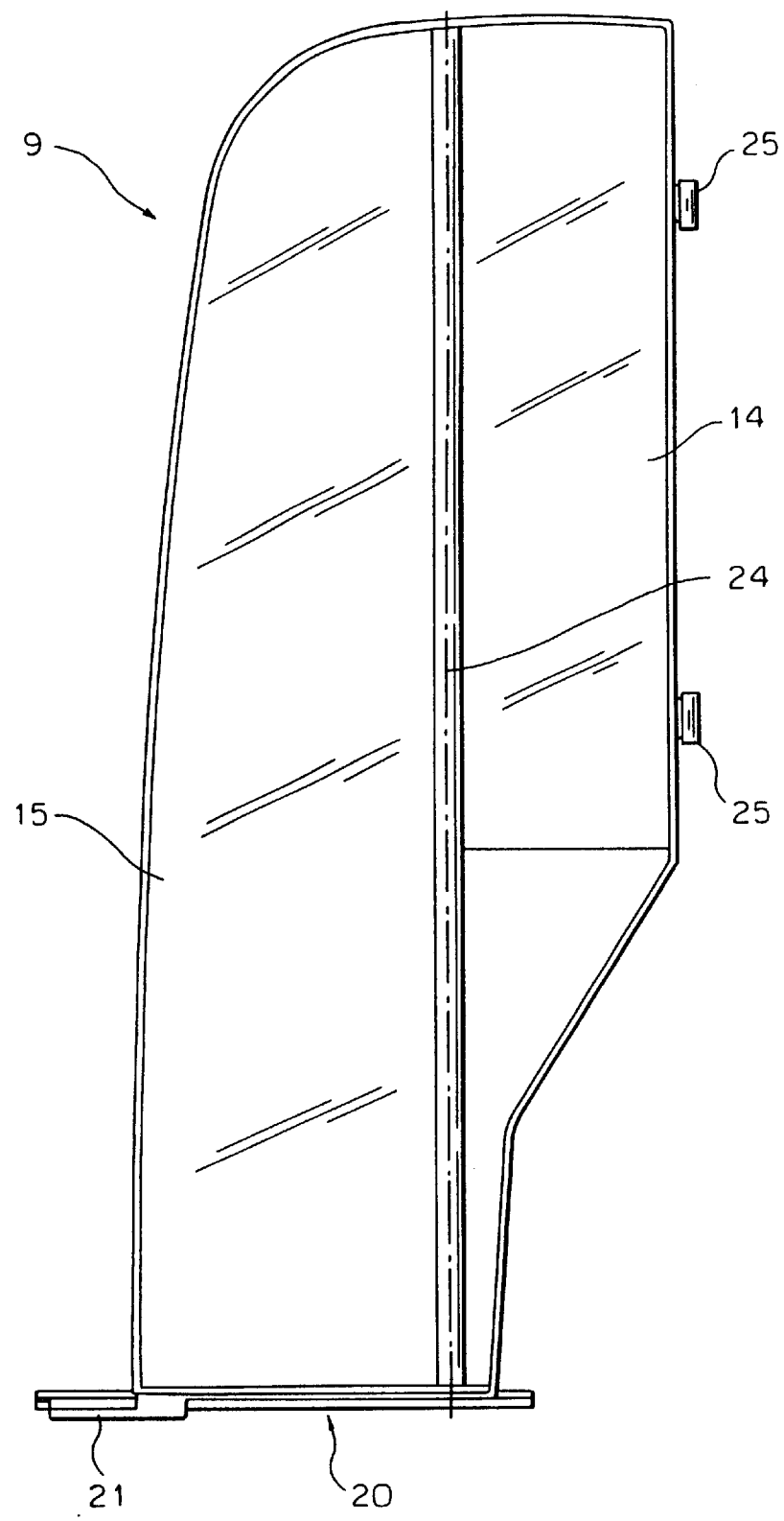
FIG. 2 is a front elevation view of the door of the cab of FIG. 1.
Figure 4:
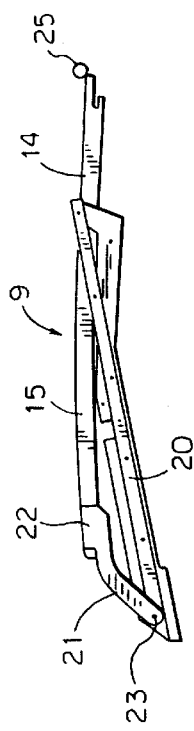
FIG. 4 is a bottom view of the door of FIG. 2.

The cab 1 further comprises at least a guide 20 obtained in proximity to the opening 8, and at least a guide element 21 integral with the door 9 and slidingly engaged to the guide 20 to guide the movements of the door 9 (FIGS. 2 through 4).

Although in the illustrated embodiment the guide 20 is positioned in proximity to the lower part 11 of the opening 8, it could alternatively be located in proximity to the upper part 10 according to a wholly arbitrary choice.

The guide element 21 is connected to the second wing 15 of the door 9 to guide its movements in the passage from the open position to the closed position.

In particular, the guide element 21 has an arched shape and it presents a first end 22 and a second end 23. The first end 22 is integral with the lower part of the second wing 15 in correspondence with its area farthest away from the hinge point, and the second end 23 is slidingly engaged to the guide 20.

More in general, embodiments can be envisioned in which the door 9 comprises more than two wings 14, 15. In this case the cab 1 comprises a plurality a guide elements 21, each connected to of the wings 14, 15.

As can be observed from FIG. 3, the door 9, when it is open, is positioned externally to the structure 7.

In particular, the first wing 14 is adjacent to the structure 7 and the second wing 15 faces the first wing 14.

To allow such a door-opening mode, the wings 14, 15 are mutually hinged by means of at least a hinge 24 mounted in correspondence with the inner surfaces of the wings 14, 15.

The hinge 24 allows the wings 14, 15 to effect a relative rotation of about 180° so they face each other in the open position.

The first wing 14 is hinged to the structure 7 in correspondence with the upper part 13 of the opening 8, by means of at least a hinge 25 mounted in correspondence with the outer surfaces of the first wing 14 and of the structure 7.

In this way, a rotation of about 180° of the first wing 14 relative to the structure 7 is enabled, so that the first wing 14 comes to be adjacent to the structure 7 once open.

The cab 1 further comprises known locking devices (not shown in the figure) to lock the door 9 in the open or closed positions.

The operation of the cab 1 for earth-moving machines of the present invention is as follows.

During the activation of the earth-moving machine the fixed part 4 of the frame 2 remains motionless on the ground, whilst the movable part 5, which bears the cab 1 and the articulated arm, can rotate relative to the fixed part by 360°.

The door 9 of the cab 1 during use can be held both in the open position and in the closed position.

To bring the door 9 from the closed position to the open position, the two wings 14, 15, which are in a nearly consecutive position, are pushed towards the rear part of the cab 1. Thanks to the fastening action provided by the hinges 24, 25 and by the guide element 21, the first wing 14 rotates relative to the structure 7 and the second wing 15 rotates relative to the first wing 14 and rotates-translates relative to the structure 7 (intermediate position represented with the dashed line 18 in FIG. 3), until the moment in which the guide element 21 has traversed the entire guide and the two wings 14, 15 are in the open position (shown with the dashed line 17 in FIG. 3).

As shown in FIG. 3 the door 9 in the open position is contained inside the operating radius R of the machine.

In the case of cabs of earth-moving machines having multiple doors 9, the invention is obviously immediately applicable by constructing each door 9 as described above.

The present invention achieves important advantages.

A cab constructed according to the above description has, as stated, the characteristic of having a door that remains within the operating radius of the machine even in the open position and regardless of the dimensions of the machine.

This allows to prevent accidental impacts of the door against obstacles that are always present in the field of operation.

In this way, in addition to avoiding the economic loss due to damage to the cab, the level of safety is also increased for the operator, who no longer runs the risk of suffering contusions, whiplash or other similar injuries.

The present invention allows to construct earth-moving machines provided with cabs whose parts are always inside the operating radius, however reduced their dimensions.

Purely by way of example, cabs for earth-moving machines in accordance with the present invention have been designed which fit within an operating radius of 690 mm.

It should further be noted that the present invention is relatively easy to realize and that the cost connected with embodying the invention is within the average standards for the type.

The invention thus conceived can be subject to numerous modifications and variations, without thereby departing from the scope of the inventive concept that characterizes it.

All components can be replaced by technically equivalent elements and in practice all materials employed, as well as their dimensions, can be any, depending on requirements.

What is claimed is:

1. A cab for earth-moving machines having a center of rotation and an operating radius corresponding to the maximum dimensions of the cab during the rotation of the machine, comprising a closed structure having at least an opening and at least a door hinged to said structure in correspondence with said opening and movable from a closed position to an open position, wherein said door comprises at least a first and a second wing mutually connected in bellows-like fashion and in that, in said open position, the distance of all points of said door from the center of rotation is lesser than the operating radius.

2. A cab as claimed in claim 1, further comprising at least a guide obtained in proximity to said opening, and at least a guide element integral with said door and slidingly engaged to said guide to guide the movements of said door.

3. A cab as claimed in claim 2, wherein said guide element is connected to said second wing of said door.

4. A cab as claimed in claim 2, wherein said guide is positioned in proximity to the lower part of said opening.

5. A cab as claimed in claim 2, wherein said door comprises a plurality of said wings, connected in bellows-like fashion, and in that it comprises a plurality of said guide elements integral with said door and slidingly engaged to said guide.

6. A cab as claimed in claim 1, wherein said door in said open position is external to said structure.

7. A cab as claimed in claim 6, wherein said wings, of said door, in said open position, face each other and are adjacent to the structure.

8. A cab as claimed in claim 6, wherein said wings, are mutually hinged by means of at least a hinge mounted in correspondence with the inner surfaces of said wings,, to allow, in the open position, the inner surface of the first wing to face the inner surface of the second wing by means of a relative rotation of about 180°.

9. A cab as claimed in claim 6, wherein said first wing is hinged to said structure by means of at least a hinge mounted in correspondence with the outer surfaces of said first wing and of said structure, to allow, in the open position, the outer surface of the first wing to face the outer surface of the structure by means of a relative rotation of about 180°.

10. A cab as claimed in claim 1 wherein said first wing of said door is hinged to said structure according to a substantially vertical axis of rotation and in that said second wing of said door is hinged to said first wing according to a substantially vertical axis of rotation.

11. A cab as claimed in claim 10, further comprising at least a guide obtained in proximity to said opening, and at least a guide element integral with said door and slidingly engaged to said guide to guide the movements of said door.

12. A cab as claimed in claim 11, wherein said guide element is connected to said second wing of said door.

13. A cab as claimed in claim 11, wherein said guide is positioned in proximity to the lower part of said opening.

14. A cab as claimed in claim 10, wherein said door in said open position is external to said structure.

15. A cab as claimed in claim 14, wherein said wings, of said door, in said open position, face each other and are adjacent to the structure.

* * * * *